(12) United States Patent
Chu

(10) Patent No.: US 11,810,177 B2
(45) Date of Patent: Nov. 7, 2023

(54) CLOTHING COLLOCATION

(71) Applicant: BAIDU ONLINE NETWORK TECHNOLOGY (BEIJING) CO., LTD., Beijing (CN)

(72) Inventor: Changsen Chu, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 156 days.

(21) Appl. No.: 17/347,540

(22) Filed: Jun. 14, 2021

(65) Prior Publication Data

US 2021/0303914 A1 Sep. 30, 2021

(30) Foreign Application Priority Data

Nov. 11, 2020 (CN) .......................... 202011254956.6

(51) Int. Cl.
*G06Q 30/0601* (2023.01)
*G06F 16/538* (2019.01)
*G06F 16/58* (2019.01)
*G06F 16/54* (2019.01)
*G06F 18/22* (2023.01)
*G06F 18/24* (2023.01)
*G06V 10/25* (2022.01)
(Continued)

(52) U.S. Cl.
CPC ....... *G06Q 30/0631* (2013.01); *G06F 16/538* (2019.01); *G06F 16/54* (2019.01); *G06F 16/5866* (2019.01); *G06F 18/22* (2023.01); *G06F 18/24* (2023.01); *G06V 10/25* (2022.01); *G06V 10/75* (2022.01); *G06V 20/20* (2022.01)

(58) Field of Classification Search
CPC .......... G06Q 30/0631; G06Q 30/0282; G06Q 30/0643; G06F 16/538; G06F 16/54; G06F 16/5866; G06F 16/22; G06F 16/24; G06F 16/583; G06F 16/535; G06V 10/25; G06V 10/75; G06V 20/20; G06V 2201/10
See application file for complete search history.

(56) References Cited

U.S. PATENT DOCUMENTS 10,043,109 B1 * 8/2018 Du .......................... G06V 10/25
10,346,893 B1    7/2019 Duan et al.
10,614,342 B1    4/2020 Lorbert et al.
(Continued)

FOREIGN PATENT DOCUMENTS

CN    105279679 A    1/2016
CN    106875203 A    6/2017
(Continued)

*Primary Examiner* — John B Strege
(74) *Attorney, Agent, or Firm* — Mauriel Kapouytian Woods LLP; Michael Mauriel; Wensheng Ma

(57) ABSTRACT

A method includes: acquiring an image of first piece of clothing to be collocated; determining information of one or more second piece of clothing for collocation with the first piece of clothing; determining clothing collocation images containing the information of the one or more second piece of clothing in the collocation image library; and selecting clothing collocation images matched with the image of the first piece of clothing from the determined clothing collocation images. The information of the one or more second piece of clothing is pre-marked clothing category information of clothing collocation images in a collocation image library.

16 Claims, 7 Drawing Sheets

(51) Int. Cl.
    *G06V 10/75*     (2022.01)
    *G06V 20/20*     (2022.01)

(56) References Cited

U.S. PATENT DOCUMENTS

| | | | |
|---|---|---|---|
| 2015/0097859 A1* | 4/2015 | Huang | G06T 11/00 345/632 |
| 2017/0083789 A1* | 3/2017 | Shah | G06T 7/90 |
| 2020/0104633 A1* | 4/2020 | Zheng | G06Q 30/0627 |
| 2021/0035187 A1* | 2/2021 | Ning | G06V 10/82 |
| 2021/0110464 A1* | 4/2021 | Tufegdzic | G06V 20/20 |
| 2021/0383153 A1* | 12/2021 | Zhang | G06F 18/2193 |

FOREIGN PATENT DOCUMENTS

| | | |
|---|---|---|
| CN | 108230082 A | 6/2018 |
| CN | 111582979 A | 8/2020 |
| JP | 2013-207407 A | 10/2013 |
| JP | 2016-33707 A | 3/2016 |
| JP | 2019-46428 A | 3/2019 |
| JP | 2020-170527 A | 10/2020 |

\* cited by examiner

CLOTHING COLLOCATION

CROSS REFERENCE TO RELATED APPLICATIONS

This application claims priority to Chinese Patent Application No. 202011254956.6, filed on Nov. 11, 2020, the contents of which are hereby incorporated by reference in their entirety for all purposes.

TECHNICAL FIELD

The present disclosure relates to the technical field of artificial intelligence, specifically relates to deep learning and image processing, and particularly relates to a clothing collocation method and apparatus, and a computing device and a medium.

BACKGROUND

As the living standard increasingly improves, people's demand for the sense of beauty of clothing is getting stronger and stronger. At present, there is a large number of clothing collocation needs in a search engine. At present, a search engine satisfies clothing collocation needs of users by using forms of articles and videos.

SUMMARY

According to one aspect of the present disclosure, a clothing collocation method is provided, including: acquiring, by one or more computers, an image of first piece of clothing to be collocated; determining, by one or more computers, information of one or more second piece of clothing for collocation with the first piece of clothing, wherein the information of the one or more second piece of clothing is pre-marked clothing category information of piece of clothing collocation images in a collocation image library; determining, by one or more computers, clothing collocation images containing the information of the one or more second piece of clothing in the collocation image library; and selecting, by one or more computers, a clothing collocation image matched with the image of the first piece of clothing from the determined clothing collocation images.

According to another aspect of the present disclosure, a computing device is provided, comprising: a memory storing one or more programs configured to be executed by one or more processors, the one or more programs including instructions for performing operations comprising: acquiring an image of first piece of clothing to be collocated; determining information of one or more second piece of clothing for collocation with the first piece of clothing, wherein the information of the one or more second piece of clothing is pre-marked clothing category information of piece of clothing collocation images in a collocation image library; determining clothing collocation images containing the information of the one or more second piece of clothing in the collocation image library; and selecting a clothing collocation image matched with the image of the first piece of clothing from the determined clothing collocation images.

According to yet another aspect of the present disclosure, a non-transitory computer-readable storage medium that stores one or more programs comprising instructions that, when executed by one or more processors of a computing device, cause the computing device to implement operations comprising: acquiring an image of first piece of clothing to be collocated; determining information of one or more second piece of clothing for collocation with the first piece of clothing, wherein the information of the one or more second piece of clothing is pre-marked clothing category information of piece of clothing collocation images in a collocation image library; determining clothing collocation images containing the information of the one or more second piece of clothing in the collocation image library; and selecting a clothing collocation image matched with the image of the first piece of clothing from the determined clothing collocation images.

According to embodiments described hereinafter, these and other aspects of the present disclosure are clear, and will be explained with reference to the embodiments described hereinafter.

BRIEF DESCRIPTION OF THE DRAWINGS

The accompanying drawings exemplarily illustrate the embodiments and constitute one part of the description, and are intended to explain exemplary implementations of the embodiments together with text descriptions of the description. The embodiments shown are for the purpose of illustration only, and are not intended to limit the scope of claims. In all the accompanying drawings, identical reference signs refer to similar but not identical elements.

DETAILED DESCRIPTION OF THE EMBODIMENTS

In the present disclosure, unless otherwise specified, terms "first", "second", and the like used to describe various elements are not intended to limit the positional relationship, timing relationship, or importance relationship of these elements. Such terms are only used for distinguishing one element from another. In some examples, a first element and a second element may refer to the same instance of the element, and in some cases, they may also refer to different instances based on the description of the context.

The terms used in the description of the various examples in the present disclosure are for the purpose of describing specific examples only, and are not intended for limitation. Unless the context clearly indicates otherwise, if the number of elements is not specifically limited, there may be one or more elements. In addition, the term "and/or" used in the present disclosure covers any one of the listed items and all possible combinations.

The embodiments of the present disclosure will be described in detail below in conjunction with the accompanying drawings.

Figure 1:
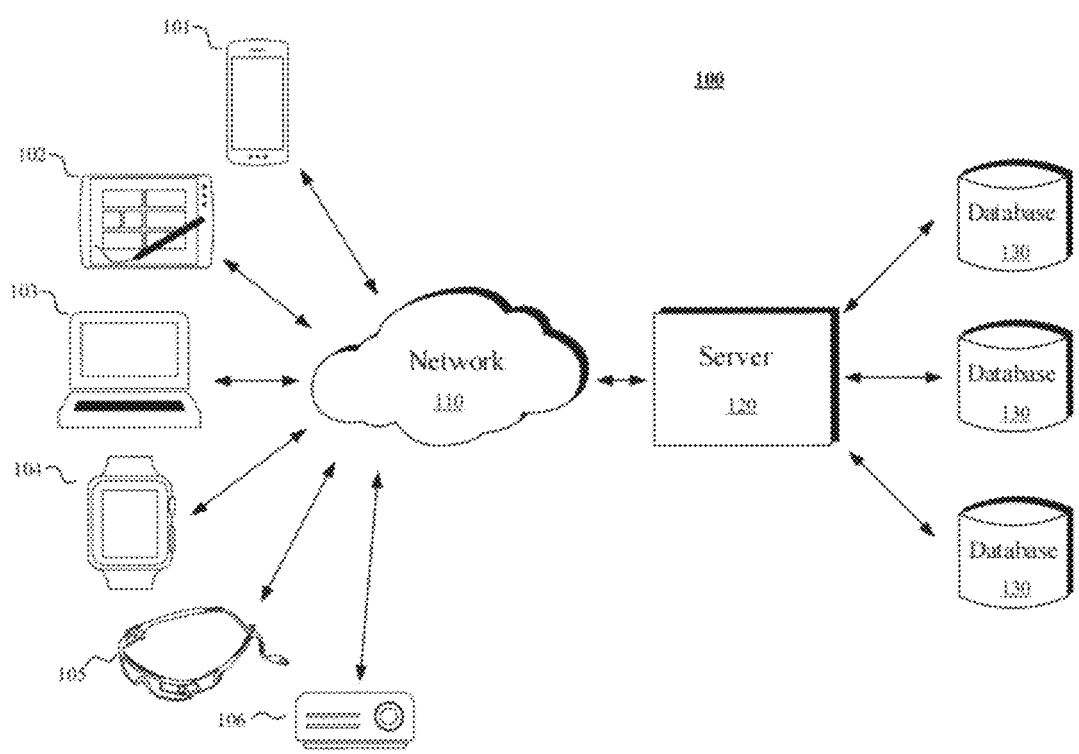
FIG. 1 illustrates a schematic diagram of an exemplary system in which various methods described herein can be implemented according to an exemplary embodiment.

FIG. 1 illustrates a schematic diagram of an exemplary system 100 in which various methods and apparatuses described herein can be implemented according to the embodiments of the present disclosure. Referring to FIG. 1, the system 100 includes one or more client devices 101, 102, 103, 104, 105 and 106, a server 120, and one or more communication networks 110 for coupling the one or more client devices to the server 120. The client devices 101, 102, 103, 104, 105 and 106 may be configured to execute one or more application programs.

In the embodiments of the present disclosure, the server 120 may run one or more services or software applications that may perform a clothing collocation method.

In some embodiments, the server 120 may also provide other services or software applications that may include non-virtual environments and virtual environments. In some embodiments, these services may be supplied as web-based services or cloud services, for example, may be supplied to a user of the client devices 101, 102, 103, 104, 105 and/or 106 under a software as a service (SaaS) model.

In the configuration shown in FIG. 1, the server 120 may include one or more components that realize a function executed by the server 120. These components may include a software component, a hardware component, or a combination thereof executed by one or more processors. The user operating the client devices 101, 102, 103, 104, 105 and/or 106 may use one or more client application programs in sequence to interact with the server 120 to use the services supplied by these components. It should be understood that various different system configurations are possible, and may be different from the system 100. Therefore, FIG. 1 is one example of a system used for implementing various methods described herein, and is not intended for limitation.

The user may use the client devices 101, 102, 103, 104, 105 and/or 106 to receive a clothing collocation request. The client devices may supply an interface that causes the user of the client devices to interact with the client devices. The client devices may also output information to the user via this interface. Although FIG. 1 only illustrates six client devices, those skilled in the art will understand that the present disclosure may support any number of client devices.

The client devices 101, 102, 103, 104, 105 and/or 106 may include various types of computing systems, such as portable handheld devices, general-purpose computers (such as personal computers and laptop computers), workstation computers, wearable devices, gaming systems, thin clients, various message transmitting and receiving devices, sensors, or other sensing devices. These computing devices can run various types and versions of software application programs and operating systems, such as Microsoft Windows, Apple iOS, UNIX-like operating systems, and Linux or Linux-like operating systems (such as Google Chrome OS); or may include various mobile operating systems, such as Microsoft Windows Mobile OS, iOS, Windows Phone and Android. The portable handheld devices may include cellular phones, smart phones, tablet computers, personal digital assistants (PDAs), and the like. The wearable devices may include head-mounted displays and other devices. The gaming systems may include various handheld gaming devices, Internet-enabled game devices, and the like. The client devices may execute various different application programs, such as various Internet-related application programs, communication application programs (such as email application programs) and short message service (SMS) application programs, and may use various communication protocols.

The network 110 may be any type of network well known to those skilled in the art, and it may use any one of a variety of available protocols (including but not limited to TCP/IP, SNA, IPX, etc.) to support data communication. For example only, the one or more networks 110 may be a local area network (LAN), an Ethernet-based network, a token ring, a wide area network (WAN), an Internet, a virtual network, a virtual private network (VPN), an intranet, an extranet, a public switched telephone network (PSTN), an infrared network, a wireless network (such as Bluetooth, WIFI) and/or any combination of these and/or other networks.

The server 120 may include one or more general-purpose computers, dedicated server computers (for example, personal computers (PC) servers, UNIX servers, and mid-range servers), blade servers, mainframe computers, server clusters, or any other suitable arrangement and/or combination. The server 120 may include one or more virtual machines running a virtual operating system, or other computing architectures involving virtualization (for example, one or more flexible pools of logical storage devices that may be virtualized to maintain virtual storage devices of a server). In various embodiments, the server 120 may run one or more services or software applications that provide the functions described below.

The computing system in the server 120 may run one or more operating systems including any of the above-mentioned operating systems and any commercially available server operating systems. The server 120 may also run any one of various additional server application programs and/or middle-tier application programs, including an HTTP server, an FTP server, a CGI server, a JAVA server, a database server, etc.

In some implementation modes, the server 120 may include one or more application programs to analyze and merge data feedbacks and/or event updates received from the user of the client devices 101, 102, 103, 104, 105 and 106. The server 120 may also include one or more application programs to display data feedbacks and/or real-time events via one or more display devices of the client devices 101, 102, 103, 104, 105 and 106.

The system 100 may also include one or more data repository 130. In some embodiments, these data repository can be used to store data and other information. For example, one or more of the data repositories 130 may be used to store information such as audio files and video files. The data repository 130 may reside in various positions. For example, data storage banks used by the server 120 may be local to the server 120, or may be away from the server 120 and may communicate with the server 120 via a network-based or dedicated connection. The data repository 130 may be of different types. In some embodiments, the data repository used by the server 120 may be databases, such as relational databases. One or more of these databases can store, update, and retrieve the data to and from the databases in response to a command.

In some embodiments, one or more of the data repositories 130 may also be used by application programs to store application program data. The data repository used by the application programs may be different types of data repository, such as a key value repository, an object repository, or a regular repository supported by a file system.

The system 100 of FIG. 1 can be configured and operated in various ways to apply various methods and apparatus described according to the present disclosure.

As people's demand for the sense of beauty of clothing is getting stronger and stronger and styles of clothing are increasingly varied, more and more people want to acquire clothing collocation guides to meet their collocation needs. For example, a search engine acquires articles or videos related to a search sentence when "What pants look good with denim coat" is searched in the search engine to satisfy the demand of a user. However, clothing collocation is strongly related to styles, for example, the denim coat alone come in a wide variety of styles, and it is harder to express style information in words. Therefore, it is extremely hard to retrieve an article or video that the user really needs. Moreover, current information such as an article has a lower density and poorer information structuralization, thereby causing lower user search efficiency and poorer experience.

Therefore, according to a clothing collocation method provided by the embodiments of the present disclosure, the clothing collocation method can precisely determine a clothing collocation need of a user and further make a customized recommendation of an overall collocation effect for the user, so as to meet the diversified clothing collocation needs of the user.

Figure 2:
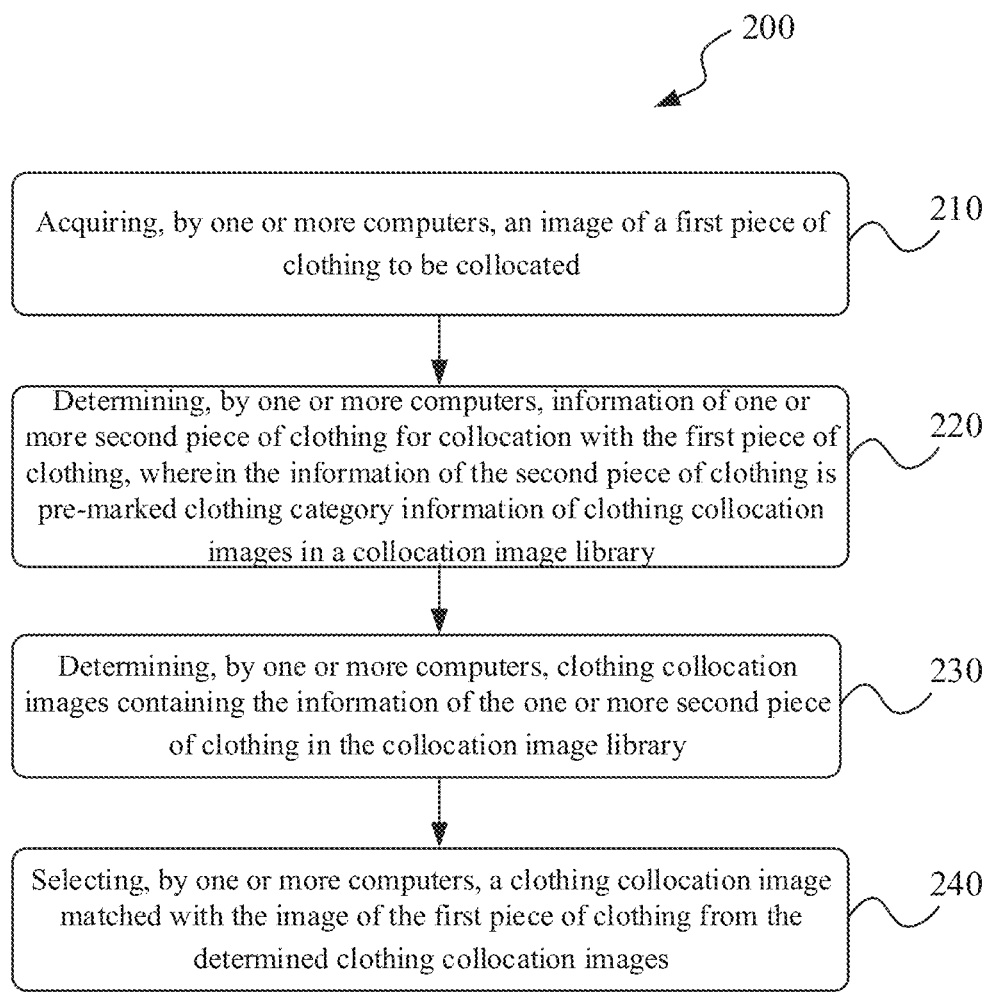
FIG. 2 illustrates a flow diagram of a clothing collocation method according to an exemplary embodiment.

FIG. 2 illustrates a flow diagram of a clothing collocation method according to an exemplary embodiment of the present disclosure. As shown in FIG. 2, the clothing collocation method 200 includes: acquiring, by one or more computers, an image of first piece of clothing to be collocated (Step 210); determining, by one or more computers, information of one or more second piece of clothing for collocation with the first piece of clothing, wherein the information of the second piece of clothing is pre-marked clothing category information of clothing collocation images in a collocation image library (Step 220); determining, by one or more computers, clothing collocation images containing the information of the one or more second piece of clothing in the collocation image library (Step 230); and selecting, by one or more computers, a clothing collocation image matched with the image of the first piece of clothing from the determined clothing collocation images (Step 240).

According to the clothing collocation method of the present disclosure, a clothing collocation need of a user can be precisely determined, and a customized recommendation of an overall collocation effect can be further made for the user, so as to meet the clothing collocation needs of the user.

At the step 210, the image of the first piece of clothing to be collocated is acquired.

According to some embodiments, the step that acquiring the image of the first piece of clothing to be collocated may include: receiving text data containing information of the first piece of clothing to be collocated; acquiring the information of the first piece of clothing in the text data based on semantic recognition; and acquiring, based on the information of the first piece of clothing, the image of the first piece of clothing corresponding to the information of the first piece of clothing.

For example, the text data containing the information of the first piece of clothing to be collocated can be acquired through a client device. For example, a user may input the text data containing the information of the first piece of clothing in an information input window (such as an input box of a search engine). For example, the text data may be: "What pants look good with denim coat". It may be acquired by means of a semantic recognition tool that the information of the first piece of clothing in the text data is "denim coat".

That is, "denim coat" is the piece of clothing that the user wants to use as a collocation basis (i.e., to be collocated). In some examples, the semantic recognition tool may be a semantic analysis tool based on natural language processing.

In some examples, it may also be set to recognize the name of piece of clothing in the input text data, and a first name of piece of clothing appearing in the text data is considered as the information of the first piece of clothing, and other names of piece of clothing are considered as the information of the second piece of clothing. It should be understood that any other methods that can be used to acquire the information of the first piece of clothing from the input text data are possible, which is not limited herein.

According to some embodiments, the step that acquiring the image of the first piece of clothing corresponding to the information of the first piece of clothing includes: acquiring an image group of the first piece of clothing corresponding to the information of the first piece of clothing from a clothing image library according to the information of the first piece of clothing; and selecting one or more images of the first piece of clothing from the image group of the first piece of clothing as the images of the first piece of clothing to be collocated. The clothing image library includes a set of image groups of the first piece of clothing corresponding to a plurality of clothing categories.

Figure 3:
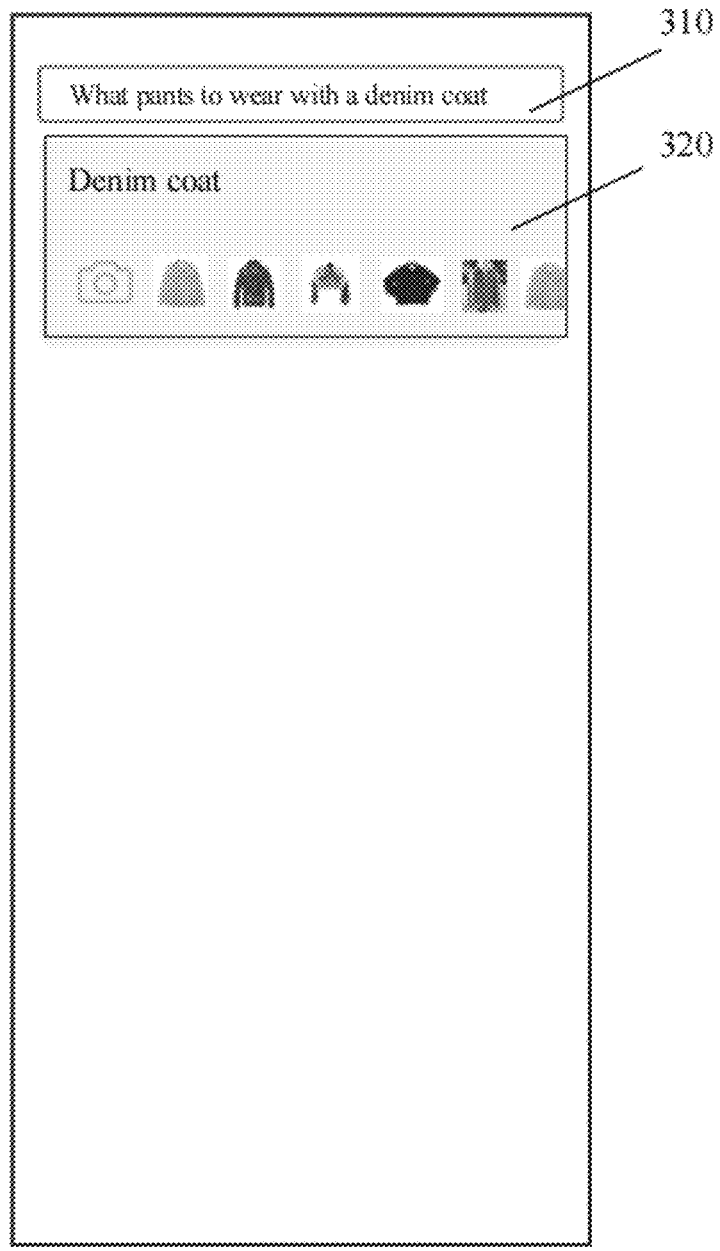
FIG. 3 illustrates a schematic diagram of acquisition of an image of first piece of clothing to be collocated according to an exemplary embodiment.

In some examples, the clothing image library including the plurality of piece of clothing categories can be configured in advance. Each piece of clothing category includes a plurality of different styles of clothing images belonging to this piece of clothing category, so as to form a clothing image group of the same piece of clothing category. For example, the piece of clothing categories may include a plurality of subdivided piece of clothing categories such as denim coats, jeans, hoodies, sport suits, sport pants, and skirts. As shown in FIG. 3, a denim coat is taken as an example. The denim coat category includes a group of denim coat images, each denim coat image represents one style of denim coat, such as light blue denim coat with three-quarter sleeves, light blue denim coat with long sleeves, light blue vest denim coat, dark blue tasseled denim coat with long sleeves, and a plurality of other subdivided styles.

In some examples, the image group of the first piece of clothing corresponding to the information of the first piece of clothing can be displayed in a user interface. The user can select one or more images of the first piece of clothing from the image group of the first piece of clothing, for example, by clicking and other operations, as the image of the first piece of clothing to be collocated.

As shown in FIG. 3, the user may acquire other clothing images corresponding to the information of the first piece of clothing through the user interface, for example, via an image capture device, or upload other clothing images corresponding to the information of the first piece of clothing through the user interface, so as to enrich the clothing image library. For example, in some embodiments, user permission can be set such that only part of users having the permission can carry out the operation for enriching the clothing image library.

According to some embodiments, the step that acquiring the image of the first piece of clothing corresponding to the information of the first piece of clothing includes: acquiring a plurality of images of the first piece of clothing corresponding to the information of the first piece of clothing from contents of a website page; and selecting one or more images of the first piece of clothing from the plurality of acquired images of the first piece of clothing as the images of the first piece of clothing to be collocated.

In some examples, the set page content includes, but is not limited to, a shopping website, a search engine, a social network site and the like. Or, in some examples, corresponding clothing images can be searched or captured on the whole web according to the acquired information of the first piece of clothing, for example via crawler.

According to some embodiments, the step that acquiring the image of the first piece of clothing to be collocated may include: receiving image data of the first piece of clothing to be collocated; determining a first target region of the first piece of clothing in the image data; and obtaining the image of the first piece of clothing based on the first target region.

For example, the image data containing the information of the first piece of clothing to be collocated can be acquired through a client device. The client device may include a user interface to receive images that are uploaded by a user and include the information of the first piece of clothing to be collocated; or, the image including the information of the first piece of clothing to be collocated may also be obtained through an image capture device such as a camera. The image including the information of the first piece of clothing to be collocated is as shown in a region 410 in FIG. 4.

In some embodiments, it may be set that text data containing the information of the first piece of clothing to be collocated can be acquired, and image data containing the information of the first piece of clothing to be collocated may also be acquired. No limitation is made herein. When textual descriptions may not be precise or the clothing image library does not include clothing images similar to the piece of clothing to be collocated, a method for receiving the image data to acquire the image of the first piece of clothing to be collocated is favorable, which may better obtain intrinsic features of the piece of clothing and may be driven by quantized data.

Figure 4:
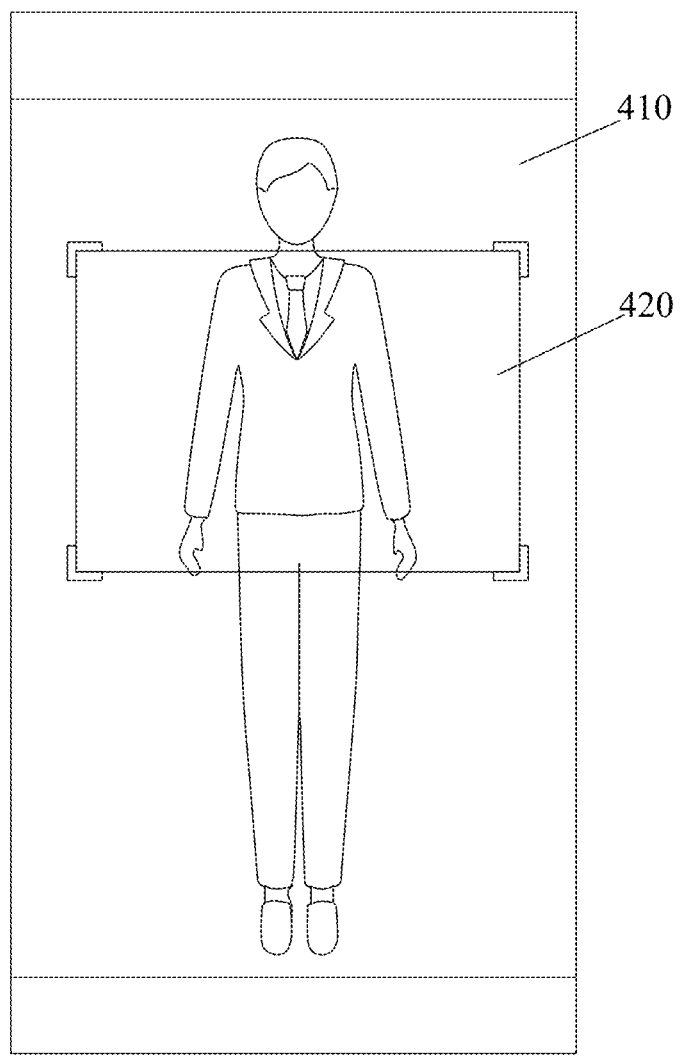
FIG. 4 illustrates another schematic diagram of acquisition of an image of first piece of clothing to be collocated according to an exemplary embodiment.

In some examples, the received or obtained image including the information of the first piece of clothing may not just include the information of the first piece of clothing, so that the step that the first target region containing the information of the first piece of clothing is further precisely determined from the received or obtained image including the information of the first piece of clothing may be included. As shown in FIG. 4, a first target region 420 including the information of the first piece of clothing in the image 410 may be determined through the user via the user interface, so as to more accurately obtain the image data containing the information of the first piece of clothing. It also further improves the accuracy in subsequent image matching and is more in line with an actual clothing collocation need of the user.

At the step 220, the information of the one or more second piece of clothing for collocation with the first piece of clothing is determined. The information of the second piece of clothing is pre-marked clothing category information of clothing collocation images in the collocation image library.

In some examples, the collocation image library that includes a plurality of clothing collocation images may be configured in advance. For example, the clothing collocation images are collected in a manner of capturing on the whole web or in other ways. The clothing categories in the collected clothing collocation images can be identified through a trained deep learning-based clothing category identification model. The identified clothing categories are marked as labels of the clothing collocation images. The clothing categories may include, for example, trousers, skirts, jackets, vests and other subdivision categories.

In some examples, a deep learning-based clothing category identification model is trained in advance. Clothing images that include various clothing categories may be collected in advance and serve as training samples for model training. For example, the convolutional neural network can be trained based on the training samples to obtain a trained clothing category identification model.

In some examples, a classifier may also be used to identify the clothing categories in the collected clothing collocation images, and mark the clothing collocation images with corresponding clothing category labels based on an identification result.

In some examples, the clothing collocation images in the collocation image library may also include information sources of the clothing collocation images, descriptive statements of the clothing collocation images, and the like in addition to their corresponding clothing category labels. For example, the descriptive statements may include, but may be not limited to, clothing brands, collocation effect descriptions, model information (such as gender information, and height and weight information), etc., which are in one-to-one correspondence to the clothing collocation images.

According to some embodiments, the step that determining the information of one or more second piece of clothing for collocation with the first piece of clothing includes: receiving text data containing the information of the second piece of clothing for collocation with the first piece of clothing; acquiring information of the second piece of clothing in the text data based on semantic recognition; and in response to the pre-marked clothing category information of the clothing collocation images in the collocation image library including the acquired information of the second piece of clothing, determining the acquired information of the second piece of clothing to be the information of the second piece of clothing for collocation with the first piece of clothing.

According to some embodiments, the step that determining the information of one or more second piece of clothing for collocation with the first piece of clothing further includes: after the acquired information of the second piece of clothing is determined to be the information of the second piece of clothing for collocation with the first piece of clothing, further determining the information of one or more second piece of clothing for collocation with the first piece of clothing based on the pre-marked clothing category information of the clothing collocation images in the collocation image library.

At the step 230, the clothing collocation images containing the information of one or more second piece of clothing in the collocation image library are determined. At the step 240, the clothing collocation images matched with the image of the first piece of clothing are selected from the determined clothing collocation images.

Figure 5:
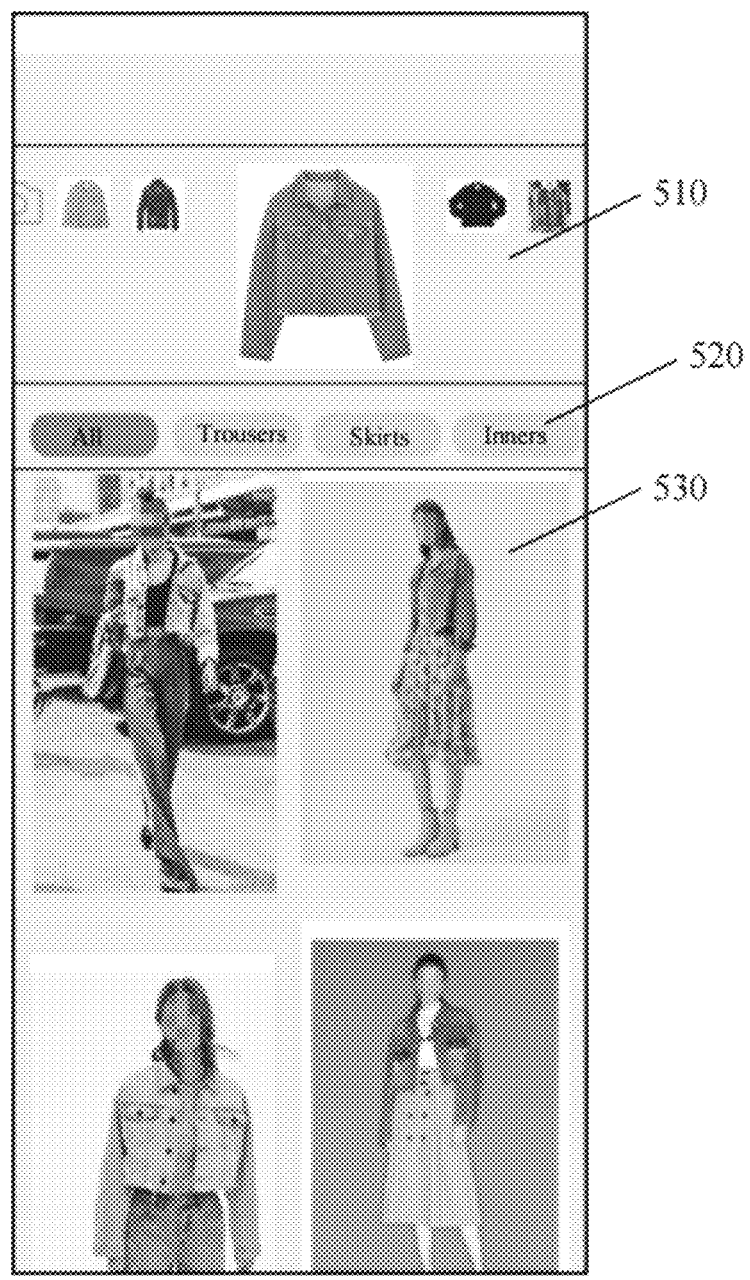
FIG. 5 illustrates a schematic diagram of clothing collocation according to an exemplary embodiment.

FIG. 5 illustrates a schematic diagram of clothing collocation according to an exemplary embodiment. As shown in FIG. 5, in a region 510, one image of the first piece of clothing to be collocated is determined from a preset clothing image library; in a region 520, information of one or more second piece of clothing for collocation with the first piece of clothing is determined, wherein the information of the second piece of clothing is pre-marked clothing category information of the clothing collocation images in the collocation image library; and in a region 530, clothing collocation images which are matched with the image of the first piece of clothing and contain the determined information of the one or more second piece of clothing are displayed.

According to some embodiments, the step that selecting the clothing collocation images matched with the image of the first piece of clothing from the determined clothing collocation images includes: performing similarity calculation on the image of the first piece of clothing and the determined clothing collocation images; and selecting clothing collocation images whose similarities with the image of the first piece of clothing are greater than a first threshold as the matched clothing collocation images. For example, the matched clothing collocation images may be sequenced according to the similarities from high to low and then are output to the user interface for displaying.

In some examples, any suitable image processing tool or algorithm may be used to perform the similarity calculation on the image of the first piece of clothing and the determined clothing collocation images. The image processing tool or algorithm may be a constructed convolutional neural network model, Cosine Distance, Euclidean Distance, Hamming Distance, or other algorithms or measures.

According to some embodiments, the step that selecting the clothing collocation images matched with the image of the first piece of clothing from the determined clothing collocation images includes: determining gender identification for clothing collocation; and selecting clothing collocation images having the gender identification from the determined clothing collocation images as the matched clothing collocation images. The clothing collocation images in the collocation image library are marked with the gender identification in advance. In some examples, the gender identification may be gender information of models in the clothing collocation images or gender information matched by the clothing, or may be a clothing collocation style in the clothing collocation image, including female style, male style, and neutral style.

In some examples, the clothing collocation images in the collocation image library are marked with collocation style labels, such as sweet, fairy, neutral, domineering lady, and office lady, so as to realize further selecting and displaying of the matched clothing collocation images by selecting the corresponding collocation styles.

In some examples, in the process of determining the clothing collocation images containing the information of the one or more second piece of clothing in the collocation image library, the clothing collocation images having the determined gender identification may be further screened out. Therefore, the clothing collocation images matched with the image of the first piece of clothing are further screened out from the screened clothing collocation images having the determined gender identification.

According to some embodiments, the method 200 further includes: acquiring clothing commodity information corresponding to the information of the one or more second piece of clothing in the selected clothing collocation images from a preset commodity library.

According to some embodiments, the step that acquiring the clothing commodity information corresponding to the information of the one or more second piece of clothing contained in the matched clothing collocation images from the preset commodity library includes: determining a second target region of the one or more second piece of clothing in the selected clothing collocation image; obtaining an image of the second piece of clothing based on the second target region; performing similarity calculation on the image of the second piece of clothing and a corresponding clothing commodity image in the preset commodity library; determining a clothing commodity image whose similarity with the image of the second piece of clothing is greater than a second threshold; and acquiring corresponding clothing commodity information according to the determined clothing commodity image.

Figure 6:
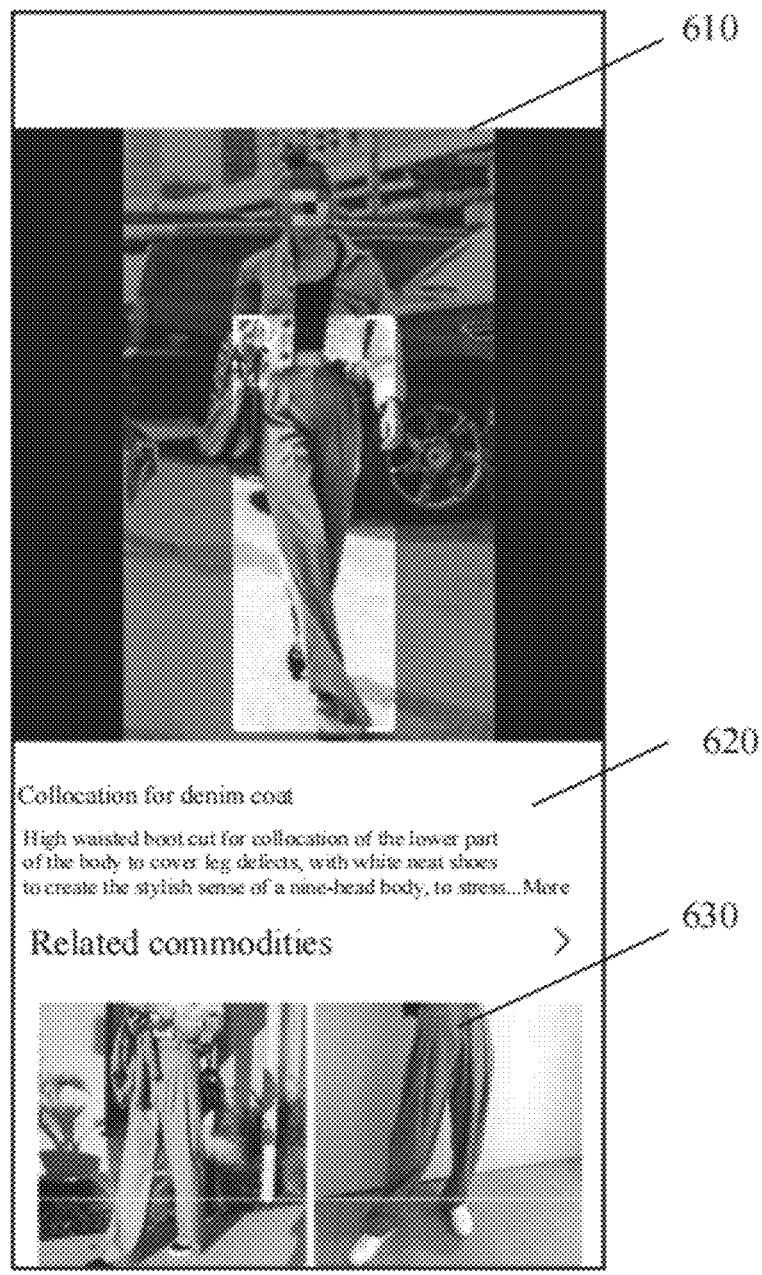
FIG. 6 illustrates a schematic diagram of acquisition of corresponding clothing commodity information according to an exemplary embodiment.

FIG. 6 illustrates a schematic diagram of recommendation of a corresponding collocation clothing commodity according to one of the clothing collocation images shown in FIG. 5. A region 610 is one of the clothing collocation images selected by a user from the clothing collocation images displayed in FIG. 5, and the information of the second piece of clothing in the clothing collocation image is a trouser, and the trouser region may be further automatically selected as the second target region containing the information of the second piece of clothing. A region 620 is a descriptive statement of the displayed clothing collocation image, which can describe the clothing collocation effect more accurately for the user and better achieve a dressing guide effect to meet the need of the user for improving the own dressing taste. A region 630 is the acquired clothing commodity information corresponding to the information of the second piece of clothing.

In some embodiments, the commodity library may be one or more e-commerce commodity libraries. For example, the data of one or more e-commerce platforms may be obtained through an open protocol, so as to access commodity library information of the e-commerce platforms. Or, cooperated e-commerce commodity libraries are accessed and integrated through the open protocol based on the own commodity library of Baidu, so as to construct a global commodity library. Based on the global commodity library, the clothing commodity information corresponding to the information of the second piece of clothing contained in the selected clothing collocation images may be acquired.

According to the clothing collocation method of the present disclosure, a clothing collocation need of a user can be precisely determined, a customized recommendation of an overall collocation effect can be further made for the user, and commodity information can be further recommended based on the collocation effect. Thereby improving the retrieval efficiency of the user and enhancing the user experience.

Figure 7:
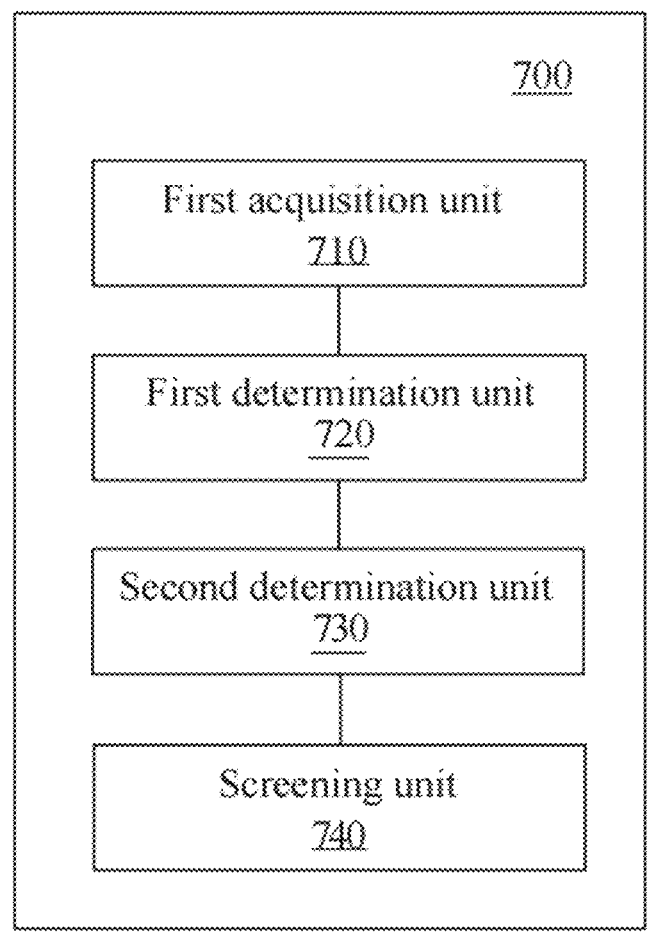
FIG. 7 illustrates a schematic diagram of a clothing collocation apparatus according to an exemplary embodiment.

According to an embodiment of the present disclosure, as shown in FIG. 7, a clothing collocation apparatus 700 is also provided, including: a first acquisition unit 710 configured to acquire an image of first piece of clothing to be collocated; a first determination unit 720 configured to determine information of one or more second piece of clothing for collocation with the first piece of clothing, wherein the information of the second piece of clothing is pre-marked clothing category information of clothing collocation images in a collocation image library; a second determination unit 730 configured to determine clothing collocation images containing the information of the one or more second piece of clothing in the collocation image library; and a screening unit 740 configured to select a clothing collocation image matched with the image of the first piece of clothing from the determined clothing collocation images.

According to some embodiments, the first acquisition unit 710 includes a unit for receiving text data containing information of the first piece of clothing to be collocated; a unit for acquiring the information of the first piece of clothing in the text data based on semantic recognition; and a unit for acquiring the image of the first piece of clothing corresponding to the information of the first piece of clothing.

According to some embodiments, the first acquisition unit 710 includes a unit for receiving image data of the first piece of clothing to be collocated; a unit for determining a first target region of the first piece of clothing in the image data;

and a unit for obtaining the image of the first piece of clothing based on the first target region.

According to some embodiments, the first determination unit 720 includes a unit for receiving text data containing the information of the second piece of clothing for collocation with the first piece of clothing; a unit for acquiring information of the second piece of clothing in the text data based on semantic recognition; and a unit for determining, in response to the pre-marked clothing category information of the clothing collocation images in the collocation image library including the acquired information of the second piece of clothing, the acquired information of the second piece of clothing to be the information of the second piece of clothing for collocation with the first piece of clothing.

According to some embodiments, the screening unit 740 includes a unit for performing similarity calculation on the image of the first piece of clothing and the determined clothing collocation images; and a unit for selecting piece of clothing collocation images whose similarities with the image of the first piece of clothing is greater than a first threshold as the matched clothing collocation images.

According to some embodiments, the apparatus further includes a second acquisition unit. The second acquisition unit is configured to acquire clothing commodity information corresponding to the information of the second piece of clothing contained in the matched clothing collocation images from a preset commodity library.

According to some embodiments, the second acquisition unit includes a unit for determining a second target region containing the information of the second piece of clothing in the matched clothing collocation images; a unit for obtaining images of the second piece of clothing based on the second target region; a unit for performing similarity calculation on the images of the second piece of clothing and corresponding clothing commodity images in the preset commodity library; a unit for determining clothing commodity images whose similarities with the images of the second piece of clothing are greater than a second threshold; and a unit for acquiring the corresponding clothing commodity information according to the determined clothing commodity images.

The operations of the above units 710-740 of the clothing collocation apparatus 700 are respectively similar to the operations of the foregoing steps 210-240, which is not described in detail herein.

According to yet another aspect of the present disclosure, a computing device is provided, including: a processor, and a memory which stores programs. The programs include instructions which, when executed by the processor, causes the processor to implement the clothing collocation method of the present disclosure.

According to yet another aspect of the present disclosure, a computer-readable storage medium for storing programs is provided. The programs include instructions which, when executed by the processor of the computing device, causes an electronic device to implement the clothing collocation method of the present disclosure.

Figure 8:
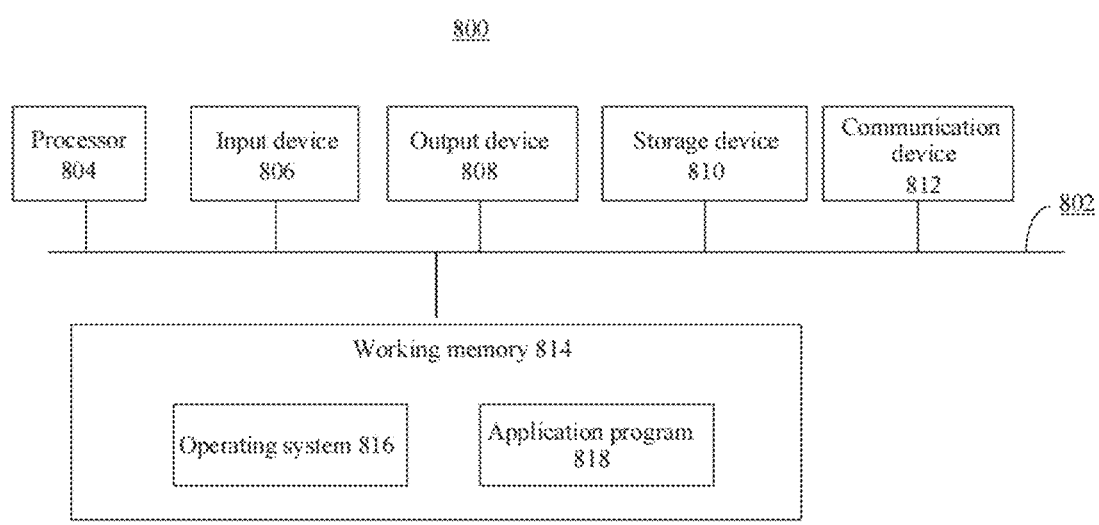
FIG. 8 illustrates a structural block diagram of an exemplary computing device which can be used for implementing the embodiments of the present disclosure.

Referring to FIG. 8, a structural block diagram of a computing device 800 that can be used as a server or client of the present disclosure is illustrated, and it is an example of a hardware device that can be applied to all aspects of the present disclosure.

The computing device 800 may include elements connected to a bus 802 or in communication with the bus 802 (possibly via one or more interfaces). For example, the computing device 800 may include a bus 802, one or more processors 804, one or more input devices 806, and one or more output devices 808. The one or more processors 804 may be any type of processor, and may include, but are not limited to, one or more general-purpose processors and/or one or more special-purpose processors (for example, special processing chips). The processor 804 may process instructions executed in the computing device 800, including instructions stored in or on the memory to display graphical information of a GUI on an external input/output device (such as a display device coupled to an interface). In other implementations, multiple processors and/or multiple buses may be used with multiple memories and multiple memories if necessary. Similarly, multiple computing devices may be connected, and each device provides part of the necessary operations (for example, as a server array, a group of blade servers, or a multi-processor system). In FIG. 8, one processor 804 is taken as an example.

The input device 806 may be any type of devices capable of inputting information into the computing device 800. The input device 806 may receive input numeric or character information and generate key signal inputs that are related to user settings and/or function control of a computing device for clothing collocation, and may include, but is not limited to, a mouse, a keyboard, a touch screen, a trackpad, a trackball, a joystick, a microphone, and/or a remote controller. The output device 808 may be any type of devices that can present information, and may include, but is not limited to, a display, a speaker, a video/audio output terminal, a vibrator, and/or a printer.

The computing device 800 may also include a non-transitory storage device 810 or may be connected to the non-transitory storage device 810. The non-transitory storage device may be any storage device that is non-transitory and may realize data storage, and may include, but is not limited to, a disk drive, an optical storage device, a solid-state memory, a floppy disk, a flexible disk, a hard disk, a magnetic tape or any other magnetic media, an optical disk or any other optical media, an ROM (read only memory), an RAM (random access memory), a cache memory and/or any other memory chips or cartridges, and/or any other medium from which a computer can read data, instructions, and/or codes. The non-transitory storage device 810 can be removed from an interface. The non-transitory storage device 810 may have data/programs (including instructions)/codes/modules/units (for example, the first acquisition unit 710, the first determination unit 720, the second determination unit 730 and the screening unit 740 shown in FIG. 7) used for implementing the above methods and steps.

The computing device 800 may also include a communication device 812. The communication device 812 may be any type of device or system that enables communication with external devices and/or networks, and may include, but is not limited to, a modem, a network card, an infrared communication device, a wireless communication device, and/or a chipset, such as a Bluetooth™ device, a 1302.11 device, a WiFi device, a WiMax device, a cellular communication device and/or the like.

The computing device 800 may also include a working memory 814 which may be any type of working memory that can store programs (including instructions) and/or data useful for the work of the processor 804, and may include, but is not limited to, an RAM and/or an ROM device.

Software elements (programs) may be located in the working memory 814, and includes, but is not limited to, an operating system 816, one or more application programs 818, drivers, and/or other data and codes. Instructions for implementing the above methods and steps may be included in one or more application programs 818, and the above methods may each be implemented by the processor 804 reading and executing instructions of the one or more application programs 818. The executable codes or source codes of the instructions of the software element (program) may also be downloaded from a remote location.

It should also be understood that various modifications can be made according to specific requirements. For example, customized hardware may also be used, and/or hardware, software, firmware, middleware, microcode, hardware description languages, or any combinations thereof may be used to realize specific elements. For example, some or all of the disclosed methods and devices can be implemented by programming, according to the logic and algorithms of the present disclosure, hardware (for example, a programmable logic circuit including a field programmable gate array (FPGA) and/or a programmable logic array (PLA)) by using an assembly language or a hardware programming language (such as VERILOG, VHDL, C++).

It should also be understood that the foregoing method can be implemented in a server-client mode. For example, a client can receive data input by a user and send the data to a server. The client can also receive the data input by the user, perform part of the processing in the foregoing methods, and send the data obtained by the processing to the server. The server can receive the data from the client, execute the foregoing methods or the other part of the foregoing methods, and return an execution result to the client. The client can receive the execution result of the methods from the server, and can, for example, present the execution result to the user through an output device. The client and the server are generally far away from each other and usually interact through a communication network. A relationship between the client and the server is generated by computer programs running on corresponding computing devices and having a client-server relationship with each other. The server can be a server of a distributed system or a server combined with a blockchain. The server can also be a cloud server, or a smart cloud computing server or smart cloud host with an artificial intelligence technology.

It should also be understood that the components of the computing device 800 may be distributed on a network. For example, one processor may be used to perform some processing, while at the same time, another processor far away from the one processor may perform other processing. Other components of the computing device 800 may also be similarly distributed. In this way, the computing device 800 may be interpreted as a distributed computing system that performs processing in multiple locations.

Although the embodiments or examples of the present disclosure have been described with reference to the accompanying drawings, it should be understood that the above-mentioned methods, systems, and devices are merely exemplary embodiments or examples, and the scope of the present disclosure is not limited by these embodiments or examples, and is only limited by the authorized claims and their equivalent scopes. Various elements in the embodiments or examples may be omitted or replaced by equivalent elements. In addition, all the steps may be performed in an order different from that described in the present disclosure. Further, various elements in the embodiments or examples can be combined in various ways. What is important is that as technology evolves, many elements described herein can be replaced by equivalent elements that appear after the present disclosure.

The invention claimed is:

1. A computer-implemented method, comprising:
   acquiring, by one or more computers, an image of a first piece of clothing to be collocated;
   determining, by one or more computers, information of one or more second piece of clothing for collocation with the first piece of clothing, wherein the information of the one or more second piece of clothing is pre-marked clothing category information of clothing collocation images in a collocation image library;
   determining, by one or more computers, clothing collocation images containing the information of the one or more second piece of clothing in the collocation image library;
   selecting, by one or more computers, a clothing collocation image matched with the image of the first piece of clothing from the determined clothing collocation images;
   and
   acquiring, from a preset commodity library, clothing commodity information corresponding to the information of the one or more second piece of clothing in the selected clothing collocation image, comprising:
      determining a second target region of the one or more second piece of clothing in the selected clothing collocation image;
      obtaining an image of the second piece of clothing based on the second target region;
      performing similarity calculation on the image of the second piece of clothing and a corresponding clothing commodity image in the preset commodity library;
      determining a clothing commodity image whose similarity with the image of the second piece of clothing is greater than a second threshold; and
      acquiring corresponding clothing commodity information according to the determined clothing commodity image.

2. The method according to claim 1, wherein acquiring the image of the first piece of clothing to be collocated comprises:
   receiving text data containing information of the first piece of clothing to be collocated;
   acquiring the information of the first piece of clothing in the text data based on semantic recognition; and
   acquiring, based on the information of the first piece of clothing, the image of the first piece of clothing corresponding to the information of the first piece of clothing.

3. The method according to claim 2, wherein acquiring the image of the first piece of clothing corresponding to the information of the first piece of clothing comprises:
   acquiring an image group of the first piece of clothing corresponding to the information of the first piece of clothing from a clothing image library, wherein the clothing image library includes a set of image groups of the first piece of clothing corresponding to a plurality of clothing categories; and
   selecting one or more images of the first piece of clothing from the image group of the first piece of clothing as the image of the first piece of clothing to be collocated.

4. The method according to claim 2, wherein acquiring the image of the first piece of clothing corresponding to the information of the first piece of clothing comprises:
   acquiring a plurality of images of the first piece of clothing corresponding to the information of the first piece of clothing from contents of a website page; and selecting one or more images of the first piece of clothing from the plurality of acquired images of the first piece of clothing as the image of the first piece of clothing to be collocated.

5. The method according to claim 1, wherein acquiring the image of the first piece of clothing to be collocated comprises:
receiving image data of the first piece of clothing to be collocated;
determining a first target region of the first piece of clothing in the image data; and
obtaining the image of the first piece of clothing based on the first target region.

6. The method according to claim 1, wherein determining the information of the one or more second piece of clothing for collocation with the first piece of clothing comprises:
receiving text data containing the information of the second piece of clothing for collocation with the first piece of clothing;
acquiring information of the second piece of clothing in the text data based on semantic recognition; and
in response to the pre-marked clothing category information of the clothing collocation images in the collocation image library comprising the acquired information of the second piece of clothing, determining the acquired information of the second piece of clothing to be the information of the second piece of clothing for collocation with the first piece of clothing.

7. The method according to claim 6, wherein the determining the information of the one or more second piece of clothing for collocation with the first piece of clothing further comprises:
after determining the acquired information of the second piece of clothing to be the information of the second piece of clothing for collocation with the first piece of clothing, further determining the information of the one or more second piece of clothing for collocation with the first piece of clothing based on the pre-marked clothing category information of the clothing collocation images in the collocation image library.

8. The method according to claim 1, wherein selecting the clothing collocation image matched with the image of the first piece of clothing from the determined clothing collocation images further comprises:
determining a gender identification for clothing collocation; and
selecting a clothing collocation image having the gender identification from the determined clothing collocation images as the matched clothing collocation image, wherein the clothing collocation images in the collocation image library are pre-marked with the gender identification.

9. A computing device, comprising:
a memory storing one or more programs configured to be executed by one or more processors, the one or more programs including instructions for performing operations comprising:
acquiring an image of a first piece of clothing to be collocated;
determining information of one or more second piece of clothing for collocation with the first piece of clothing, wherein the information of the one or more second piece of clothing is pre-marked clothing category information of clothing collocation images in a collocation image library;
determining clothing collocation images containing the information of the one or more second piece of clothing in the collocation image library;
selecting a clothing collocation image matched with the image of the first piece of clothing from the determined clothing collocation images; and
acquiring, from a preset commodity library, clothing commodity information corresponding to the information of the one or more second piece of clothing in the selected clothing collocation image, comprising:
determining a second target region of the one or more second piece of clothing in the selected clothing collocation image;
obtaining an image of the second piece of clothing based on the second target region;
performing similarity calculation on the image of the second piece of clothing and a corresponding clothing commodity image in the preset commodity library;
determining a clothing commodity image whose similarity with the image of the second piece of clothing is greater than a second threshold; and
acquiring corresponding clothing commodity information according to the determined clothing commodity image.

10. The computing device according to claim 9, wherein acquiring the image of the first piece of clothing to be collocated comprises:
receiving text data containing information of the first piece of clothing to be collocated;
acquiring the information of the first piece of clothing in the text data based on semantic recognition; and
acquiring, based on the information of the first clothing, the image of the first piece of clothing corresponding to the information of the first piece of clothing.

11. The computing device according to claim 9, wherein acquiring the image of the first piece of clothing to be collocated comprises:
receiving image data containing information of the first piece of clothing to be collocated;
determining a first target region containing the information of the first piece of clothing in the image data; and
obtaining the image of the first piece of clothing based on the first target region.

12. The computing device according to claim 9, wherein determining the information of the one or more second piece of clothing for collocation with the first piece of clothing comprises:
receiving text data containing the information of the second piece of clothing for collocation with the first piece of clothing;
acquiring information of the second piece of clothing in the text data based on semantic recognition; and
in response to the pre-marked clothing category information of the clothing collocation images in the collocation image library comprising the acquired information of the second piece of clothing, determining the acquired information of the second piece of clothing to be the information of the second piece of clothing for collocation with the first piece of clothing.

13. The computing device according to claim 9, wherein selecting the clothing collocation image matched with the image of the first piece of clothing from the determined clothing collocation images further comprises:
determining a gender identification for clothing collocation; and selecting a clothing collocation image having the gender identification from the determined clothing collocation images as the matched clothing collocation image, wherein the clothing collocation images in the collocation image library are pre-marked with the gender identification.

14. A non-transitory computer-readable storage medium that stores one or more programs comprising instructions that, when executed by one or more processors of a computing device, cause the computing device to implement operations comprising:

acquiring an image of a first piece of clothing to be collocated;

determining information of one or more second piece of clothing for collocation with the first piece of clothing, wherein the information of the one or more second piece of clothing is pre-marked clothing category information of clothing collocation images in a collocation image library;

determining clothing collocation images containing the information of the one or more second piece of clothing in the collocation image library;

selecting a clothing collocation image matched with the image of the first piece of clothing from the determined clothing collocation images; and acquiring, from a preset commodity library, clothing commodity information corresponding to the information of the one or more second piece of clothing in the selected clothing collocation image, comprising:

determining a second target region of the one or more second piece of clothing in the selected clothing collocation image;

obtaining an image of the second piece of clothing based on the second target region;

performing similarity calculation on the image of the second piece of clothing and a corresponding clothing commodity image in the preset commodity library;

determining a clothing commodity image whose similarity with the image of the second piece of clothing is greater than a second threshold; and acquiring corresponding clothing commodity information according to the determined clothing commodity image.

15. The method according to claim 1, wherein selecting the clothing collocation image matched with the image of the first piece of clothing from the determined clothing collocation images comprises:

performing similarity calculation on the image of the first piece of clothing and the determined clothing collocation images; and selecting a clothing collocation image whose similarity with the image of the first piece of clothing is greater than a first threshold as the matched clothing collocation image.

16. The computing device according to claim 9, wherein selecting the clothing collocation image matched with the image of the first piece of clothing from the determined clothing collocation images comprises:

performing similarity calculation on the image of the first piece of clothing and the determined clothing collocation images; and selecting a clothing collocation image whose similarity with the image of the first piece of clothing is greater than a first threshold as the matched clothing collocation image.

* * * * *